United States Patent

[11] 3,558,084

[72] Inventor Robert B. Cotton
 1503 Old Orchard Road, Media, Pa. 19063
[21] Appl. No. 734,815
[22] Filed June 5, 1968
[45] Patented Jan. 26, 1971
 Continuation-in-part of application Ser. No. 557,448, June 14, 1966, now Patent No. 3,400,903.

[54] GAS TURBINE
 12 Claims, 8 Drawing Figs.
[52] U.S. Cl. .................................................. 244/63
[51] Int. Cl. .................................................. B64f 104
[50] Field of Search ...................................... 244/63;
 253/40, 101; 60/(G. Digest); 180/7, 53;
 230/134.5, 134 (SHM)

[56] References Cited
 UNITED STATES PATENTS
 968,862  8/1910  Ljungstrom .................. 253/101X
 2,450,950 10/1948 Goddard .................... 60/G-DigestUX
 2,523,008  9/1950  Goddard .................... 60/G-DigestUX
 3,013,714 12/1951  Smith et al. ................. 230/134.5

Primary Examiner—Milton Buchler
Assistant Examiner—Paul E. Sauberer
Attorney—Connolly and Hutz ABSTRACT: A gas flow turbine for use in conjunction with a jet engine includes a series of radially disposed blades mounted about a periphery of a circular support wheel. The edges of the blades are substantially free of obstruction to minimize impediment to the flow of gas directed against them. This causes the turbine wheel to derive a substantial thrust from the gas flowing against it without materially impeding such flow. A convenient form of such turbine includes slightly curved blades centrally mounted in cantilever manner to a rotatable disc with their ends extending therefrom. Despite the minimal reaction imparted to the wheel by the gases, substantial energy is derived from the gases discharged from a jet engine without materially reducing the engine's efficiency. The turbine's energy may be advantageously utilized for a multitude of purposes including general augmentation of jet engine thrust, particularly for improving efficiency of launching thrust and auxiliary uses in conjunction with jet engine exhaust including electric power generation.

PATENTED JAN 26 1971

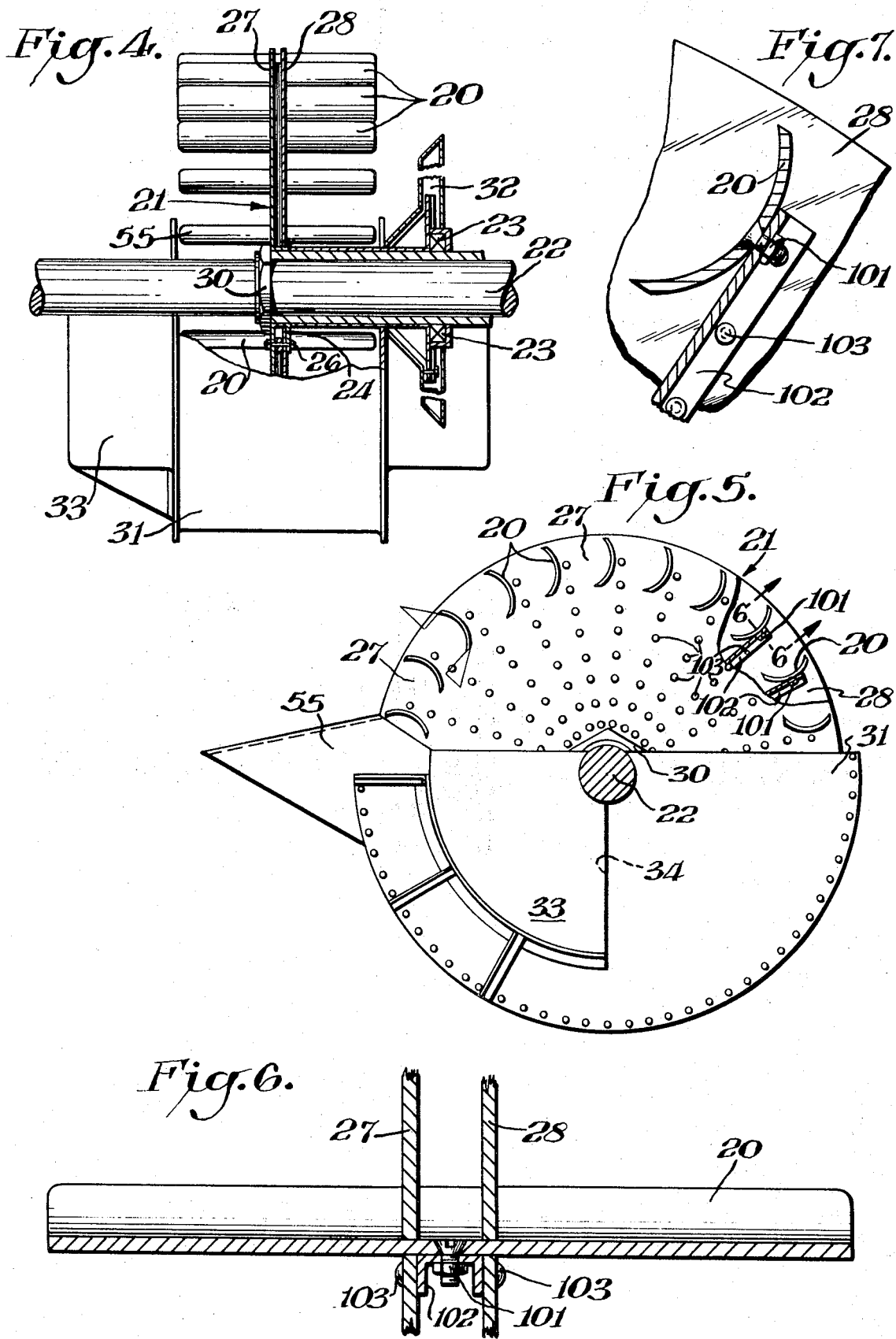

GAS TURBINE

CROSS-REFERENCE TO RELATED APPLICATION

This application is a continuation-in-part of application Ser. No. 557,448, filed Jun. 14, 1966 now U.S. Pat. No. 3,400,903.

BACKGROUND OF THE INVENTION

This invention relates to a gas turbine and more particularly to such a turbine to be driven by a relatively unconcentrated flow of hot gas. It is more particularly directed to such a turbine for use in conjunction with the exhaust from the type of jet engine utilized for propelling vehicles such as aircraft and jet powered cars. Jet engines are quite efficient for driving vehicles such as aircraft and jet-powered cars after they have been accelerated to cruising speed. They are however relatively inefficient while they are accelerating from a standstill or from lower speeds. Patent application Ser. No. 557,448, filed Jun. 14, 1966, discloses and claims a thrust augmenter for supplementing the thrust of jet propelled objects such as jet airplanes and jet cars and a turbine for use in conjunction therewith. The turbine is uniquely effective in conjunction with the exhaust from a jet engine and this application is particularly directed to the unique structure of such a turbine.

SUMMARY OF THE INVENTION

A gas flow turbine for use in conjunction with a jet engine includes a series of radially disposed blades mounted about a periphery of a circular support wheel. The edges of the blades are substantially free of obstruction to minimize impediment to the flow of gas directed against them. This causes the turbine wheel to derive a substantial thrust from the gas flowing against it without materially impeding such flow. A convenient form of such turbine includes curved blades centrally mounted in a cantilever manner to a rotatable disc with their ends extending therefrom. Despite the minimal reaction imparted to the wheel by the gases, substantial energy is derived from the gases discharged from a jet engine without materially reducing the engine's efficiency. This energy may be advantageously utilized for a multitude of purposes including augmentation of jet engine thrust, particularly for improving efficiency of launching thrust and other uses in conjunction with jet engine exhaust including electric power generation.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which:

FIG. 4 is an enlarged front view in elevation partially broken away in cross section of the turbine shown in FIGS. 1—3;

FIG. 5 is a side view in elevation of the turbine shown in FIG. 4 with a portion broken away and in cross section;

FIG. 6 is a cross-sectional view taken through FIG. 5 along the line 6—6;

FIG. 7 is an enlarged view of part of the broken away portion of FIG. 5; and

DETAILED DESCRIPTION

The subject matter of patent application Ser. No. 557,448, filed Jun. 14, 1966, is incorporated herein by reference thereto.

Figure 2:
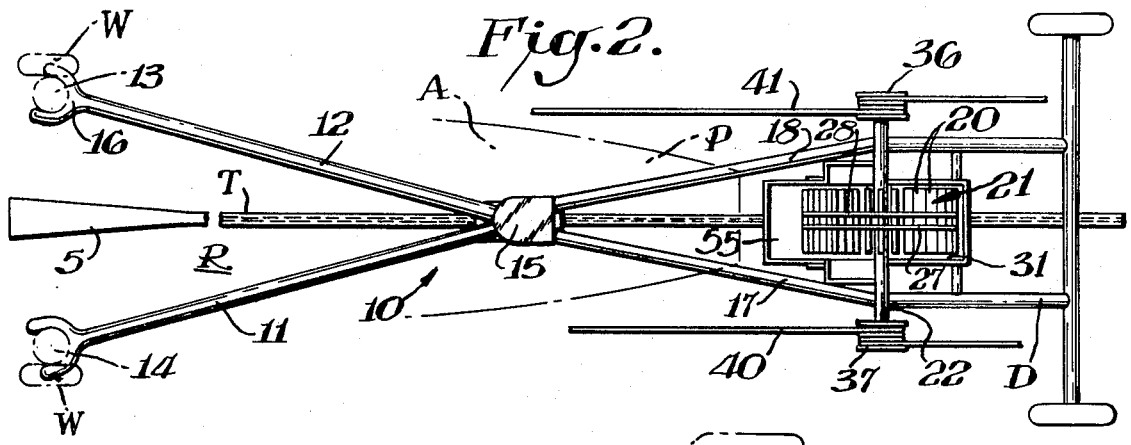
FIG. 2 is a top plan view of the embodiment shown in FIG. 1.
Figure 1:
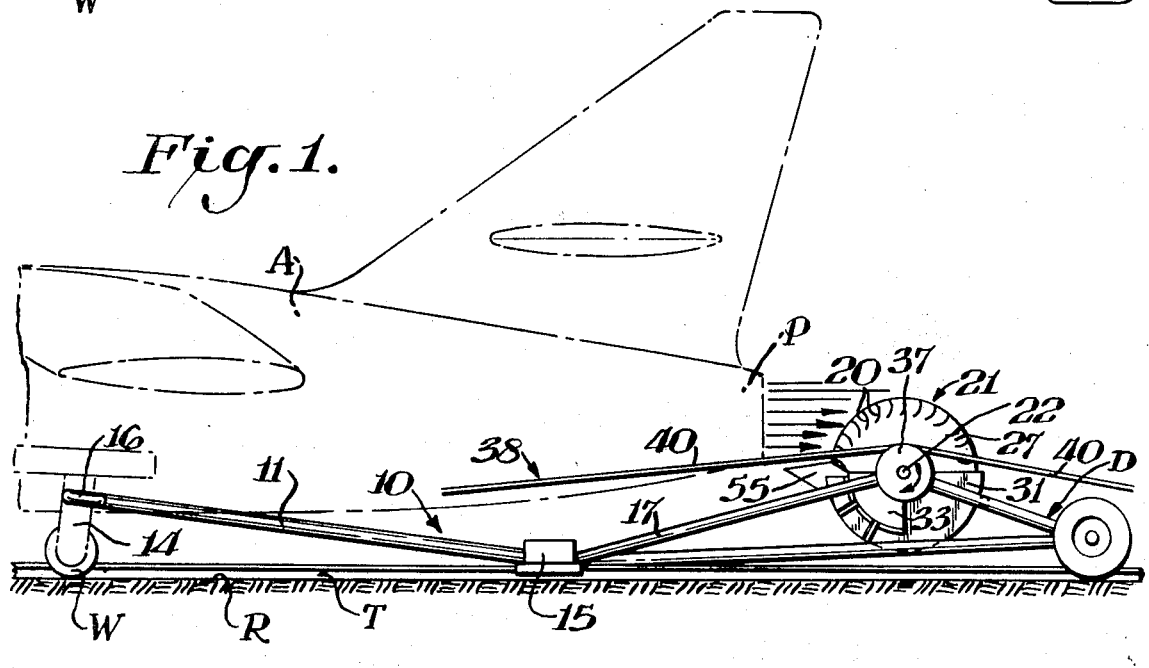
FIG. 1 is a view in elevation of one embodiment of this invention in conjunction with the exhaust from a jet airplane.
Figure 3:
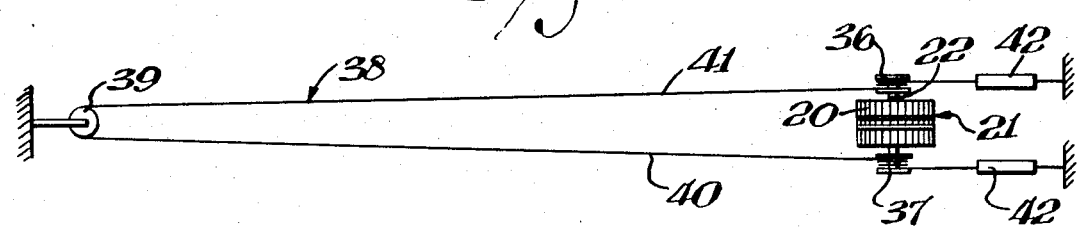
FIG. 3 is a top plan schematic diagram of the turbine and capstan portion of the embodiment shown in FIGS. 1 and 2.

Referring in detail to the drawings and first with particular reference to FIG. 1, 2 and 3, there is shown a jet aircraft A to be launched from a runway R with a central guide track T, wherein the aircraft undercarriage rear wheels W on each side of the guide track are engaged by a pusher means, such as a V-shaped yoke 10 with pusher bars of arms 11 and 12 pivoted at the apex to a track engaging slipper or shoe 15 engaged at forked ends 16 with spaced strut members 13 and 14 of each rear aircraft strut. The slipper or track shoe 15 is also connected to rearwardly diverging frame bars 17 and 18 of a turbine dolly D hereinafter described. Also, the tail pipe P of the jet aircraft A is positioned to direct and apply a flow of exhaust gases from the tail pipe P, or if there are dual tail pipes, on the turbine blades 20 of turbine wheels 21, such as illustrated in FIGS. 4 and 6.

The turbine 21 is mounted on a wheel supported frame or dolly D, see FIGS. 1 and 2, and is journaled to turn axle shaft 22 with the capstans 36 and 37. As the turbine wheel 21 is driven by exhaust gas energy, the capstan revolve and are thus forced to move along a fixed loop of cable 38 when the turbine applies torque to the capstans. The cable 38 is reeved around equalizer sheave 39 and loops therefrom to attach to a suitable cable tension means, such as for example sections of nylon rope or tape 42 suitably coupled to the ends 40 and 41 of the fixed cable. The coupling means between the cable and nylon tension means may be any suitable coupling arrangement such as linked clevis members (not shown). In each embodiment described the track, the cable loop and its tensioning and mounting may be identical. However, in some instances the track may be eliminated and the cable may be single cable sections not in a loop.

Thus from the foregoing description in connection with the embodiments of FIGS. 1, 2 and 3, the basic feature of the arrangement is to utilize the exhaust gases of the jet engine, of the airplane being launched, to provide the energy necessary to operate the launcher during the launch rollout along the runway R. The vehicle, however, may also be a land craft.

The turbine wheel or wheels 21 may be mounted or splined on an axle 22. The hub of the turbine wheel as shown in FIG. 4 comprises a collar 24 with a mating bore and keyway for slidably mounting over the axle 22 to bearing carriage 23, said collar being secured by bolts 26 to spaced turbine blade mounting rings or annulus means 27 and 28.

The turbine structures of FIGS. 1, 2 and 3 may be modified whereby the turbine axle mounts a radial flow turbine wheel at each end of the axle 22 rather than one single axial flow turbine wheel at the center of the axle as shown schematically in FIGS. 1 and 3.

The turbine wheel or wheels generally referenced by the numeral 21, as shown in FIG. 4, have a retaining nut 30 suitably secured over the end of the axle 22 and the lower half of the turbine wheel may be partly enclosed by a shroud 31 and a laterally positioned circular plate 32 adjacent the inboard side of the wheel and an exhaust outlet scoop 33 at a cutout 34 in the shroud 31 on the both side of the wheel. Plate 32 is a deflector to help keep hot gas from damaging the respective adjacent capstan and cable arrangements. The shroud 31 increases the efficiency of the gas flow by reducing pumping of the gases at this location of the turbine. Each turbine wheel 21 also includes an air scoop 55 adapted to capture and direct the tail pipe exhaust gases into the upper exposed periphery of wheel 21.

FIGS. 5—7 show the details of the manner of securement of blades 20 to discs 27, 28. As indicated therein each blade 20 extends through a pair of aligned slots in discs 27 and 28 so that the blades are radial with respect to the wheel 21 and are substantially parallel to the axle shaft 22. The slots in discs 27 and 28 correspond to the cross section of wheels 20 to accurately position the blades and assure free flow of gas between the blades after impingement thereon. Blades 20 extend away from both sides of discs 27 and 28 substantially equal amounts as most clearly shown in FIG. 6. As also shown in FIG. 6, channel shaped members 102 are positioned between discs 27 and 28 to space the discs and maintain their slots in alignment for receiving blades 20. Member 102 is secured to discs 27 and 28 by for example rivets 103. Additionally, each blade 20 is secured to channel member 102 by means of nuts and bolts 101. It is to be understood that other suitable pin and aperture fastening means or in fact any satisfactory conventional fastening means may be used in place of the rivets and in place of nuts and bolts.

Figure 8:
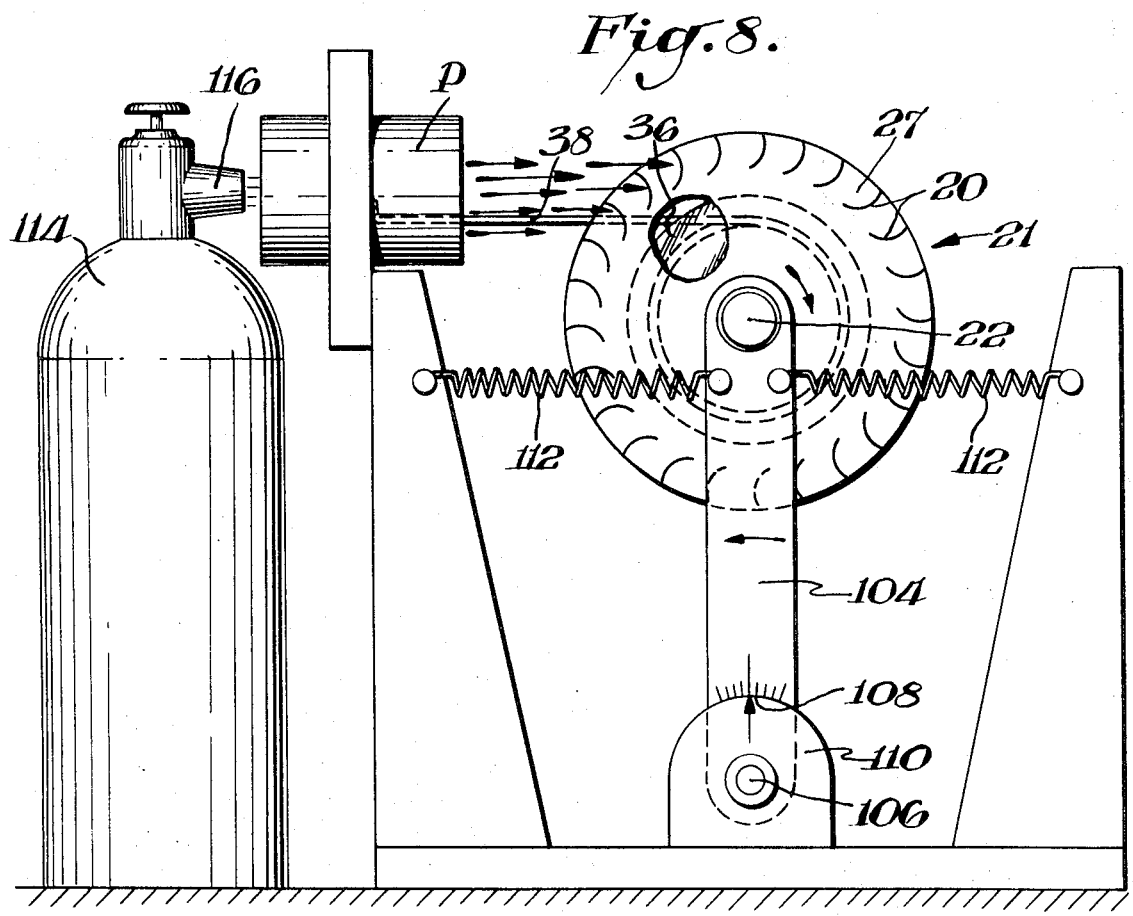
FIG. 8 is a schematic diagram in side elevation of an embodiment of this invention installed in a test arrangement.

FIG. 8 exemplifies an actual demonstration of the successful operation of gas turbine wheel 21 of the invention. In the test apparatus illustrated in FIG. 8 wheel 21 is mounted upon an arm 104 which pivots about rod 106. A scale 108 on arm 104 and fixed plate 110 indicates the relative position of the arm. During the rest position, arm 104 is maintained at the zero marking of scale 108 under the action of opposed springs 112. The arrangement also includes a capstan 36 so that the turbine 21 is in the static position. The arrangement also includes a source of compressed air 114 having an outlet 116 for directing air through nozzle P which simulates a tail pipe.

With the arrangement of FIG. 8 when the valve in compressed air tank 114 is opened air is directed through nozzle P against turbine wheel 21. Ordinarily the wheel would simply rotate under the influence of the gas flow. However, because of the inclusion of cable 38 anchored to capstan 36 the tendency for the turbine to simply rotate is resisted and results in arm 104 being deflected toward nozzle P. The deflection which is measured on scale 108 is also a measure of the tension in cable 38. Test results indicate that when using a 200 cu. ft. 3,000 p.s.i. air tank 114 which was opened for a period of five seconds, the thrust was more than two times the value of the arrangement in the static position, thus clearly indicating how a substantial thrust is developed by the use of turbine 21.

I claim:

1. A gas flow turbine comprising a circular support wheel having a central axis, bearing means mounting said support wheel for rotation about said central axis, a series of blades mounted about the periphery of said wheel, said blades being disposed substantially radially with respect to said wheel and substantially parallel to said central axis, gas flow directing means disposed for impinging a flow of gas radially and tangentially against approximately one quadrant of said wheel whereby said blades in said one quadrant are substantially flooded with said flow of gas, the edges of said blades being substantially free of obstruction whereby said flow of gas directed against them flows freely between said blades after impingement thereupon to derive a substantial thrust from said gas flow without materially impeding it, said gas flow directing means comprising a jet propelled vehicle having a tail pipe which exhausts said gas flow therefrom, and connecting means between said turbine and said vehicle for transmitting said thrust from said turbine to said vehicle.

2. A turbine as set forth in claim 1 wherein said wheel comprises disc means, said blades extending away from both sides of said disc means substantially equal amounts, and the ends of said blades being substantially free of connection whereby impediment to the flow of gas between said blades is minimized.

3. A turbine as set forth in claim 2 wherein said disc means comprises a pair of axially spaced metal discs secured to each other and the central portions of said blades being secured to said axially spaced discs.

4. A turbine as set forth in claim 3 wherein said axially spaced discs include a series of peripheral slots corresponding to the cross section of said blades, said blades extending through said said slots, and fastening means securing the central portion of said blades within said spaced discs.

5. A turbine as set forth in claim 4 wherein pin and aperture type fastening means secure said blades to said discs means.

6. A turbine as set forth in claim 3 wherein a series of radially disposed longitudinal structural members are disposed between said disc means, fastening means secure said disc means to said members, the portions of said blades between said disc means contacting members, and fastening means secure said contacting portions of said blades and said members to each other.

7. A turbine as set forth in claim 6 wherein said members comprise channel means, and said fastening means connecting said disc means to said channel means and said blades to said members comprising pin and aperture type fasteners.

8. A turbine as set forth in claim 7 wherein said fastening means comprise nuts and bolts.

9. A turbine as set forth in claim 1 wherein a shield is disposed about a portion of said turbine for diverting hot gas from an adjacent area being protected.

10. A turbine as set forth in claim 1 wherein said blades have a slightly curved cross section in the radial direction.

11. A turbine as set forth in claim 10 wherein said blades are connected approximately at a midportion to said wheel with their ends extending therefrom, whereby the free flow said gas through them is promoted.

12. A turbine as set forth in claim 1 wherein said vehicle is a jet airplane.